United States Patent [19]

Koros et al.

[11] Patent Number: 5,403,561
[45] Date of Patent: Apr. 4, 1995

[54] MIXED PHASE FIXED BED REACTOR DISTRIBUTOR

[75] Inventors: Robert M. Koros, Westfield; Yiu W. Wong, Succasunna; John T. Wyatt, Florham Park; David C. Dankworth, Whitehouse Station, all of N.J.

[73] Assignee: Exxon Research & Engineering Co., Florham Park, N.J.

[21] Appl. No.: 113,163

[22] Filed: Aug. 27, 1993

[51] Int. Cl.6 .............................................. B01J 8/04
[52] U.S. Cl. .................................. 422/195; 239/517; 239/518; 261/98; 422/193; 422/212; 422/224; 422/257; 422/261
[58] Field of Search .................. 261/98, 97, DIG. 75, 261/111; 422/211, 212, 191, 195, 256, 224, 193, 257, 261; 239/517, 518

[56] References Cited

U.S. PATENT DOCUMENTS

| | | | |
|---|---|---|---|
| 2,568,875 | 9/1951 | Wethly et al. | 261/111 |
| 2,797,423 | 7/1957 | Rizor | 239/518 |
| 3,259,380 | 7/1966 | Brown | 261/97 |
| 3,273,872 | 9/1966 | Eckert | 261/97 |
| 3,281,133 | 10/1966 | Eckert | 261/97 |
| 3,556,737 | 1/1971 | Boyd | 261/97 |
| 3,824,080 | 7/1974 | Smith et al. | 422/195 |
| 4,126,540 | 11/1978 | Grosboll et al. | 261/97 |
| 4,133,645 | 1/1979 | Scott | 422/211 |
| 4,159,291 | 6/1979 | Bruckert et al. | 261/97 |
| 4,669,890 | 6/1987 | Peyrot | 261/97 |
| 4,808,350 | 2/1989 | Robbins et al. | 261/97 |
| 5,013,491 | 5/1991 | Nutter | 261/97 |
| 5,135,684 | 8/1992 | Mohn et al. | 261/DIG. 75 |
| 5,254,292 | 10/1993 | Gabryelczyk et al. | 261/DIG. 75 |

Primary Examiner—Amalia L. Cantiago
Attorney, Agent, or Firm—Joseph J. Dvorak

[57] ABSTRACT

The uniform distribution of mixed phase fluid stream on to the top of a contact bed in a reactor chamber is provided by a horizontal tray with a plurality of spaced-apart, vertically disposed chimneys extending through the tray. These chimneys have a first end to receive liquid and gas above the tray and a second end for distributing the liquid and gas downwardly below the tray. Importantly, the second end is provided with a spray generating device located below the tray for producing a conical downward spray of the mixed fluid phase onto the top surface of a bed of contact material positioned below the tray. The spray generating devices for producing the conical spray are located at positions so that the spray of the mixed fluid stream from one spray generating device as it impinges on the top surface of the fixed bed, will overlap the spray from an adjacent spray generating device.

5 Claims, 2 Drawing Sheets

MIXED PHASE FIXED BED REACTOR DISTRIBUTOR

FIELD OF THE INVENTION

The present invention relates to a method and apparatus for uniformly distributing a mixed phase reactant stream on to the surface of a fixed bed of contact material.

BACKGROUND OF THE INVENTION

There are numerous petroleum and chemical processes which require uniformly distributing a mixed phase reactant stream with a bed of contact materials, such as catalyst particles. Uniform distribution is important to assure maximum utilization of the contact material. Various devices have been developed in an attempt to affect more uniform distribution of mixed phase reactant streams. These devices have been employed above the contact bed in a single bed reactor and they have been employed above a plurality of beds in a multi-bed contact reactor.

It is an object of this invention to provide improved distribution of a mixed phase reactant stream to a fixed bed of contact material.

Another object of the present invention is to provide an improved method and apparatus for distributing a mixed stream of liquid and vapor through a bed of solid catalyst material, which method and apparatus can be utilized both at high liquid mass velocities and low liquid mass velocities.

Another object of the present invention is to provide an improved mixed phase distributor means that substantially uniformly distributes mixed phase reactant stream across the top of a contact bed without the stream impinging on intermediate beams and other structures located within the reactor vessel.

SUMMARY OF THE INVENTION

Accordingly, the present invention provides for the uniform distribution of mixed phase fluid stream onto the top of a contact bed in a reactor chamber by providing a horizontal tray with a plurality of spaced-apart, vertically disposed chimneys extending through the tray. These chimneys have a first end to receive liquid and gas above the tray and a second end for distributing the liquid and gas downwardly below the tray. Importantly, the second end is provided with means located below the tray for producing a conical downward spray of the liquid and gas onto the top surface of a bed of contact material positioned below the tray. The means for producing the conical spray are located at positions whereby the spray of liquid and gas, as it impinges on the top surface of the fixed bed, will overlap.

In a preferred embodiment of the present invention, the means for producing the conical spray comprises a metallic ribbon wound the form of an inverted conical helix extending from the first end of the chimney.

BRIEF DESCRIPTION OF THE DRAWINGS

The foregoing and other objects and benefits of the invention will be more fully set forth below in connection with the "Detailed Description of the Invention" and in connection with the drawings, in which.

DETAILED DESCRIPTION OF THE DRAWINGS

The present invention will now be described with particular reference to a reactor having two fixed beds of contact material in which the liquid vapor distribution device of the present invention is positioned between the two beds. It should be readily appreciated, however, that the distribution device of the present invention can be used equally as well with a single bed of contact material reactor or with a reactor having more than two fixed beds of contact material.

Figure 1:
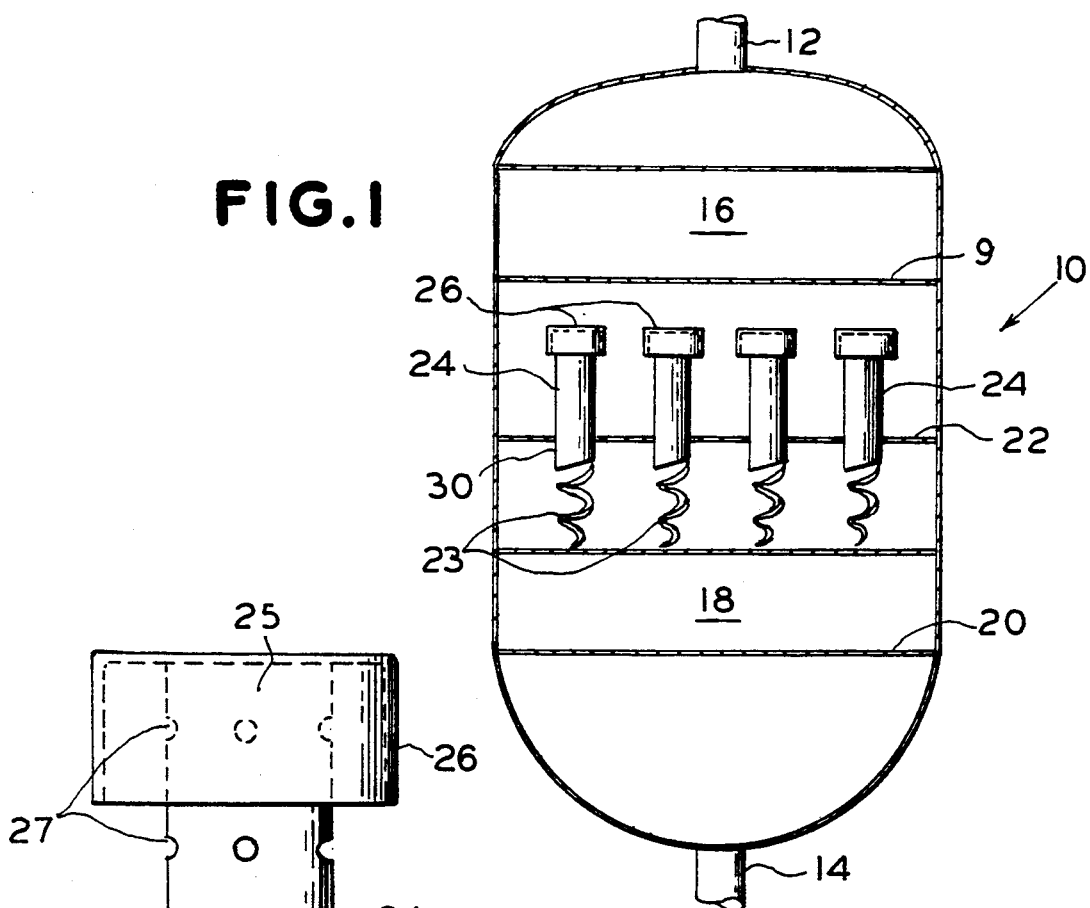
FIG. 1 is a schematic longitudinal cross-section illustrating a two bed reactor embodying a preferred form of the structure according to the invention.

Turning now to FIG. 1, there is shown reactor vessel 10 that has a top inlet 12 for the introduction of mixed phase reactants and a bottom outlet 14 for the removal of product stream. Located in the vessel are two spaced-apart beds 16 and 18 of contact material, typically catalyst particles 1, supported on a horizontally disposed pervious plate 9 and 20, respectively. The distribution device of the present invention is located between beds 16 and 18 and comprises a horizontally disposed tray 22 having a plurality of cylindrical chimneys 24 extending above the plate 22 for receipt of liquid and gaseous material for downward distribution below the plate 22. Means 23 are provided for producing a conical spray of the mixed phases onto the top surface of the fixed bed 18. Each of the chimneys 24 is provided with a cap 26.

Figure 2:
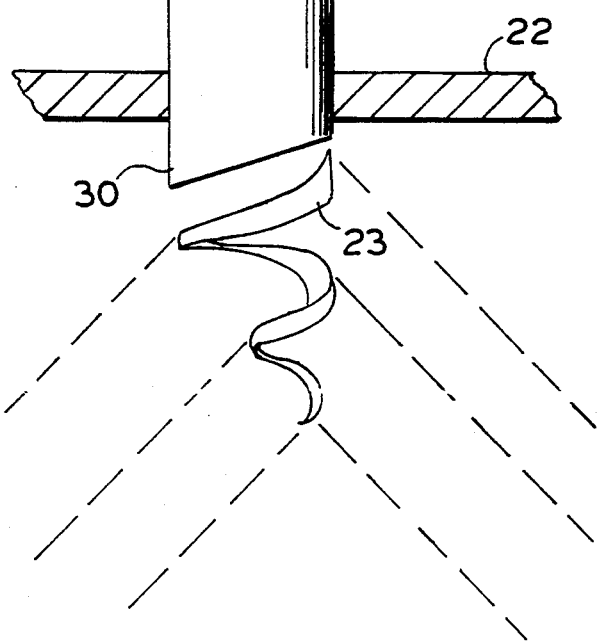
FIG. 2 is an enlarged, partial view showing the structure illustrated in FIG. 1.

As is shown in FIG. 2, the chimney 24 has a first end 25 that extends above plate 22 and has a plurality of openings 27 therein for receipt of the gaseous or vapor phase material. In this particular embodiment, the apertures 27 are shown as circular holes; however, any shape opening that is convenient may be employed. The chimney 24 is also provided with a cap 26.

Also shown in FIG. 2 is a plurality of liquid inlet apertures 28 and 29. These are shown as generally vertically slots arranged around the circumference of the chimney 24 and located below the vapor inlets 27 and above the tray 22. As is shown in FIG. 2, the length of slots 28 and 29 are not equal, with slots 28 extending downwardly closer to plate 22 than slots 29. Under high liquid loadings in the reactor vessels, both slots 28 and 29 will serve as inlets for liquid into chimney 24. Under sufficiently low liquid levels on the tray 22, only slot 28 will serve as a liquid inlet. Optionally, liquid inlet slots may be all of the same length.

As can be seen in FIG. 1, chimney 24 is provided with a second end 30 for discharge of liquid and vapor downwardly onto the bed 18 located below tray 22. As shown in greater detail in FIG. 2, the second end 30 includes means 23 for producing a conical spray, of a fluid and gas, which spray is shown by the dotted lines. In the embodiment shown in FIG. 2, the means for producing the conical spray consists of a ribbon in the form of a conical helix having its base facing upward and its apex downwardly. Importantly, each of the conical helixes is designed to provide sufficient conical spray of liquid and vapor so that the mixed phase from one means 23 as it impinges on the top of the catalyst bed 18 overlaps the spray of mixed phase produced from the next adjacent means 23.

As will be readily appreciated, cap 26 may be spaced apart from the first end 25 of chimney 24 by any suitable spacing means.

Figure 3:
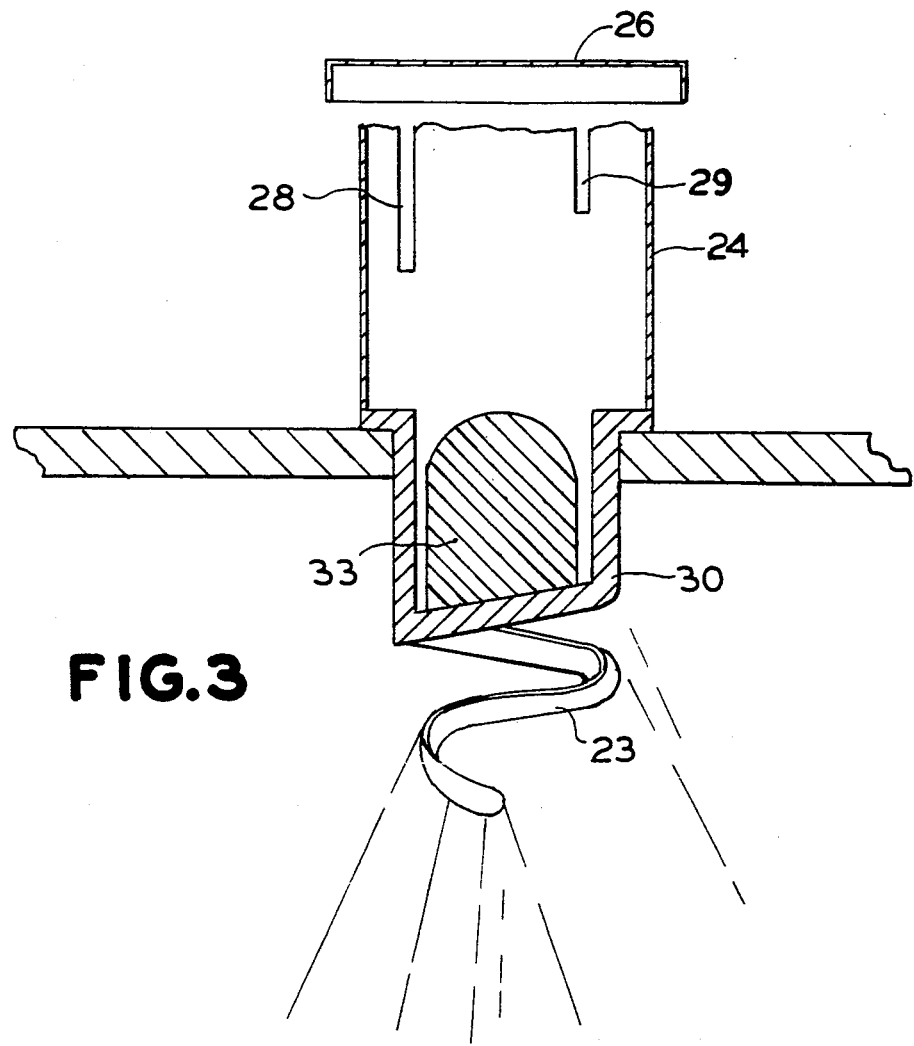

In the embodiment shown in FIG. 3, a mandrel 33 is positioned within the second end 30. Mandrel 33 has an outer diameter less than the inner diameter of end 30, defining an annular space therebetween. Mandrel 33 serves to drive the fluids to the inner wall of second end 30 which thereby increases the swirl imparted to the fluids.

Figure 4:
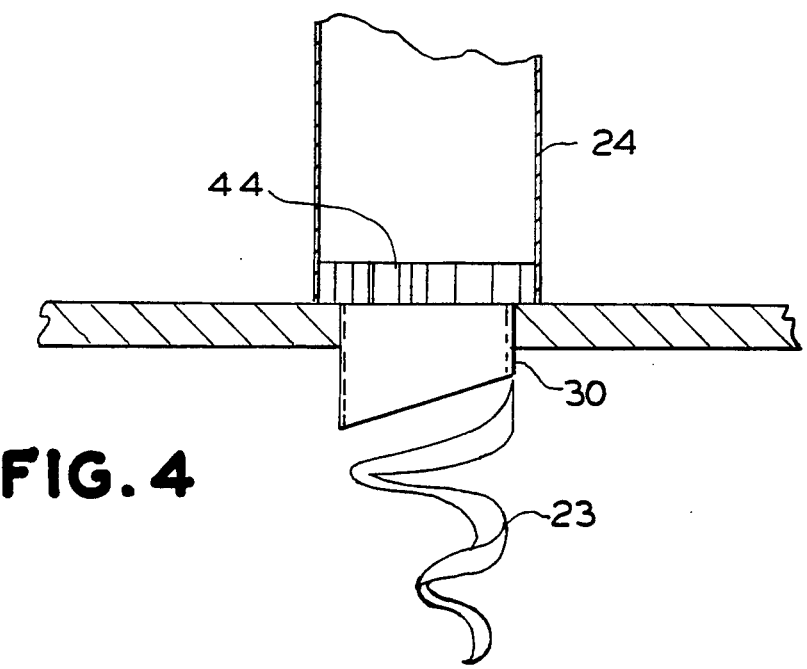
FIGS. 3 and 4 are partial views of alternate embodiments of the present invention.

In the embodiment shown in FIG. 4, a plurality of swirl vanes 44 are positioned within chimney 24 for fluids before they enter end 30 for discharge a conical spray produced by means 23 injecting a swirling motion to the mixed phase.

It is an important feature of the present invention that each conical spray producing means 23 is designed to produce a spray pattern on the top of the contact bed immediately below the tray sufficient to overlap the spray pattern produced by at least one adjacent spray producing means. Thus, the chimneys 24 and hence the spray means 23 are so positioned that substantially none of the spray produced impinges on beams and other structural reactor internals located below tray 22 and above the contact material of bed 18.

The maximum flow through the device at acceptable pressure drop and the angle of the spread of the conical spray pattern are controlled by the choice of ribbon pitch, diameter width and length. The angle of the spray and overlap determines the appropriate distance between the tray carrying the spray device and the catalyst bed.

Another important feature of the invention is the self-adjusting control of uniform vapor flow through each distribution element. This control is provided by the uniform back pressure due to the pressure drop exerted by the flow of vapor and liquid through the conical spray producing zone in combination with the uniform flow of liquid provided by the chimney slots. A surprising discovery is that this apparatus operates over wide variations in liquid and vapor flow rates while providing excellent flow distribution performance.

In addition, when in a preferred operating mode, fine droplets ranging between 10 micron and 1000 microns are produced. These extremely small drops are dispersed and suspended in the vapor flow providing the fixed bed below the tray with a uniform vapor/liquid flow mixture which via normal bed flow dynamics characteristics will be distributed uniformly within the top entrance region of the catalyst bed.

What is claimed is:

1. In a reactor having a flow distributing apparatus therein for distributing a mixed phase fluid stream on the top of a contact bed in the reactor, the improvement wherein said distributing apparatus comprises:
    a horizontally disposed tray located above the top of the contact bed within the reactor;
    a plurality of spaced-apart, vertically disposed chimneys extending through the tray, the chimneys having a first end to receive a mixed fluid phase above the tray and a second end for downward discharge of the mixed fluid phase below the tray;
    a metallic ribbon in the form of an inverted conical helix extending downwardly from the second end of the chimneys for producing a conical downward spray of mixed fluid phase onto the top of the contact bed.

2. The improvement of claim 1 wherein the chimneys are spaced-apart relative to each other that downward conical spray from the metallic ribbon for producing the spray of a chimney overlaps the conical spray from the means of at least one adjacent chimney on the top of the contact bed extending downwardly from the second end of the chimney.

3. The improvement of claim 1 including a plurality of swirl vanes located within the chimneys for imparting swirling motion to vapor and liquid therein.

4. The improvement of claim 1 including a mandrel centrally located within the second end of each of the chimneys, the mandrel having an outer diameter less than an inner diameter of the chimney thereby defining an annular space therebetween whereby a swirl is imparted to the vapor and liquid discharged from the chimneys.

5. A flow distributing apparatus comprising:
    a horizontally disposed tray;
    vertically disposed chimneys extending through the tray, the chimneys having a first end adapted to receive a vapor and fluid stream and a second end for downward discharge of the vapor and fluid stream below the tray;
    a metallic ribbon in the form of an inverted conical helix extending downwardly from the second end of the chimneys for producing a conical downward spray fluid.

* * * * *